United States Patent [19]

Nakayama et al.

[11] Patent Number: 5,396,346
[45] Date of Patent: Mar. 7, 1995

[54] IMAGE PROCESSING METHOD AND APPARATUS USING ROUNDING PROCESSING

[75] Inventors: Tadayoshi Nakayama, Tokyo; Hiromi Fukuda, Kawasaki, both of Japan

[73] Assignee: Canon Kabushiki Kaisha, Tokyo, Japan

[21] Appl. No.: 73,000

[22] Filed: Jun. 7, 1993

[30] Foreign Application Priority Data

Jun. 10, 1992 [JP] Japan ................... 4-150402

[51] Int. Cl.$^6$ ............ H04N 1/387; H04N 1/38; H04N 1/46; G03F 3/08
[52] U.S. Cl. ................ 358/448; 358/450; 358/463; 358/515; 358/523; 358/530
[58] Field of Search ............. 358/448, 445, 450, 463, 358/455, 474, 515, 518, 523, 530

[56] References Cited

U.S. PATENT DOCUMENTS 5,309,258  5/1994  Kouno et al. ................. 358/530

FOREIGN PATENT DOCUMENTS 62-117484  5/1987  Japan .

*Primary Examiner*—Edward L. Coles, Sr.
*Assistant Examiner*—Kimberly A. Williams
*Attorney, Agent, or Firm*—Fitzpatrick, Cella, Harper & Scinto

[57] ABSTRACT

An image processing apparatus and method capable of suppressing noise and improving the S/N ratio of a processing output signal when a color signal representing color image data is processed. The RGB→YUV converter is comprised of conversion units 201-1 . . . 201-k, adder 205, and rounding processing circuit 206 which are built in the image processing apparatus such as a color printer, each of the conversion units 10 201-1 . . . 201-k is provided with an adder 11 between the multiplier 10 and rounding processing unit 12 and corrects errors generated by the rounding processing circuit 206.

10 Claims, 8 Drawing Sheets

IMAGE PROCESSING METHOD AND APPARATUS USING ROUNDING PROCESSING

BACKGROUND OF THE INVENTION

This invention relates to an image processing method and apparatus thereof, and more particularly, to an image processing method and apparatus which performs a rounding processing.

When a conversion processing is performed on k input data having an arbitrary bit length, if a conventional processing circuit shown in FIG. 8 is used, output data includes some amount having a positive deviation or negative deviation from a mathematical or theoretical value (hereinafter referred to as a "true value"). In such errors, there is an error element which can be canceled out when statistically meaningful data are added or data including an error are integrated over a predetermined period of time (hereinafter referred to as a "symmetric error"). There is also an error element in which the error cannot be canceled out by the above operation (hereinafter referred to as an "asymmetric error").

In the conventional processing circuit shown in FIG. 8, when k input data $x_1, x_2, \ldots, x_k$ (whose data lengths are $n_1, n_2, \ldots, n_k$ bits respectively) are inputted from an input terminal 1010 in parallel, each of the data is respectively multiplied in conversion units $(T_1)$ 1020, $(T_2)$ 1030, $\ldots$, $(T_k)$ 1040 and a rounding processing is performed. The k output data $x'_1, x'_2, \ldots, x'_k$ (whose data lengths are $m_1, m_2, \ldots, m_k$ bits respectively) obtained from these conversion units are added together by an adder 1050 and a single data whose data length is $m'$ bits is obtained. The rounding processing is performed on this data by a rounding processing circuit 1060 and the result is outputted as a rounded output X whose data length is P bits.

In the above processing, when a predetermined number of data having statistical meaning or data over the predetermined period of time are considered, maximum errors $\pm\Delta x_1, \pm\Delta x_2, \ldots, \pm\Delta x_k$ are respectively generated in the output data $x'_1, x'_2, \ldots, x'_k$ by the rounding processing in the conversion units $(T_1, \ldots T_k)$. If an asymmetric error with respect to the true value is $\alpha$, and a symmetric error is $\beta$ (where $\alpha$ and $\beta$ are both positive or both negative), the maximum errors generated by the rounding processing of the rounding processing circuit 1060 are as follows:

$$
\begin{aligned}
&\text{when } \alpha, \beta \geq 0 \\
&\quad \alpha + \beta \quad \text{(an error deviated to the positive direction from the true value)} \\
&\quad -\beta \quad \text{(an error deviated to the negative direction from the true value)} \\
&\text{when } \alpha, \beta < 0 \\
&\quad -\beta \quad \text{(an error deviated to the positive direction from the true value)} \\
&\quad -(\alpha + \beta) \quad \text{(an error deviated to the negative direction from the true value)}
\end{aligned} \tag{1}
$$

Accordingly, the maximum error generated in the output X is a sum of errors generated by the rounding processing in the conversion units $(T_1 \ldots T_k)$ and errors generated by the rounding processing circuit 1060, and expressed by the formula (2):

$$
\begin{aligned}
&\text{when } \alpha, \beta \geq 0, \\
&\quad \sum_{i=1}^{k} \Delta x_i + \alpha + \beta \quad \text{(an error deviated to the positive direction from the true value)} \\
&\quad -\sum_{i=1}^{k} \Delta x_i - \beta \quad \text{(an error deviated to the negative direction from the true value)} \\
&\text{when } \alpha, \beta < 0, \\
&\quad \sum_{i=1}^{k} \Delta x_i - \beta \quad \text{(an error deviated to the positive direction from the true value)} \\
&\quad -\sum_{i=1}^{k} \Delta x_i + \alpha + \beta \quad \text{(an error deviated to the negative direction from the true value)}
\end{aligned} \tag{2}
$$

When the processing is performed in accordance with the above conventional approach, as indicated by the formula (2), the maximum error having positive deviation from the true value in the output X is not equal to the maximum error having negative deviation. Accordingly, when the output X is considered on the predetermined number of data or the data over the predetermined period of time, the asymmetric error cannot be canceled and remains contrary to the symmetric error. This remainder appears as a noise component in a signal processing and an S/N ratio of the signal processing is deteriorated as an asymmetric error becomes larger.

For example, the case where the processing circuit shown in FIG. 8 is adapted in a color printer connected to a host computer, color image data such as RGB signals inputted from the host computer are inputted to the color printer. A color conversion processing is performed on the RGB signals for color image formation in the printer and the RGB signals are converted to data represented in the other color space (e.g. YUV, L*a*b*, YMCBk). The processing circuit shown in FIG. 8 is used for this color conversion processing. However, as described above, an asymmetric error is generated by the rounding processing in the color conversion processing and this remains as noise in the output signal (the color data after the conversion). In other words, generation of the asymmetry error causes deterioration of color reproducibility in the color conversion processing.

Furthermore, the color conversion processing is repeated numerous times in the color printer, and the asymmetric errors are accumulated, thus creating a problem in the color reproducibility in the color image data processing.

SUMMARY OF THE INVENTION

Accordingly, it is an object of the present invention to provide an image processing apparatus capable of improving the S/N ratio in a signal processing and a color reproducibility in the color image data processing.

According to the present invention, the foregoing object is attained by providing an image processing apparatus comprising: conversion means for performing a conversion processing on a plurality of input image data; addition means for adding the plurality of the results by the conversion means; and first rounding processing means for performing a rounding processing on the sum obtained by the addition means, wherein the conversion means includes: multiplying means for multiplying a plurality of the input image data by a predetermined coefficient; correction means for correcting each of the products generated by the multiplying means with the consideration of the error generated by the first rounding means; and second rounding processing means for performing a rounding processing on each of the corrected products by the correction means.

It is another object of the present invention to provide an image processing method capable of improving the S/N ratio in a signal processing and the color reproducibility in the color image data processing.

According to the present invention, the foregoing object is attained by providing a method of processing a plurality of image data with at least two rounding processing step comprising a: input step for inputting a plurality of image data; multiplying step for respectively multiplying the plurality of image data by a predetermined conversion coefficient; correction step for correcting each of the plurality of the sums by the multiplying step with consideration of errors generated by a second rounding processing; first rounding processing step for performing the first rounding processing on each of the corrected results by the correction step; addition step for adding the corrected results which are subjected to the rounding processing; second rounding processing step for performing the second rounding processing on the results of the addition by the addition step; and output step for outputting a final result by the second rounding processing step.

In accordance with the present invention as described above, in conversion means, a plurality of input image data are multiplied by a predetermined coefficient in multiplying means, each of the plurality of multiplied results by the multiplying means is corrected in the correcting means with the consideration of errors generated by a first rounding processing means, and another rounding processing is performed on each of the plurality of multiplied results by the correcting means in a second rounding processing means.

The invention is particularly advantageous since generation of errors can be suppressed, the S/N ratio of the signal processing is improved, and color reproducibility in the color image data processing is improved.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE PREFERRED EMBODIMENTS

Preferred embodiments of the present invention will now be described in detail in accordance with the accompanying drawings.

<The First Embodiment>

Figure 1:
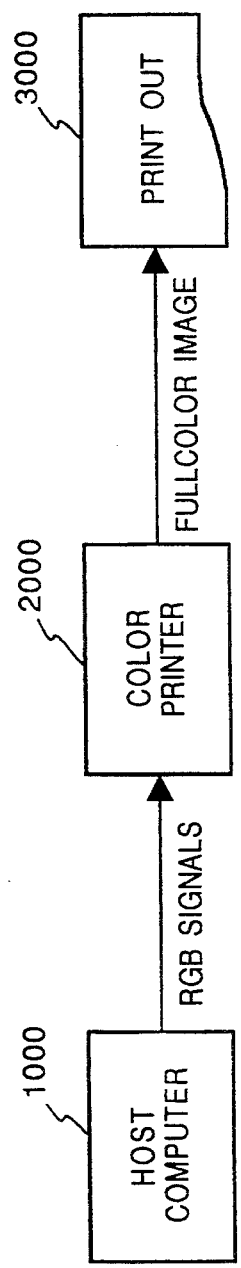
FIG. 1 is a block diagram showing the operating environment of a full-color printer of an embodiment of the present invention.
Figure 2:
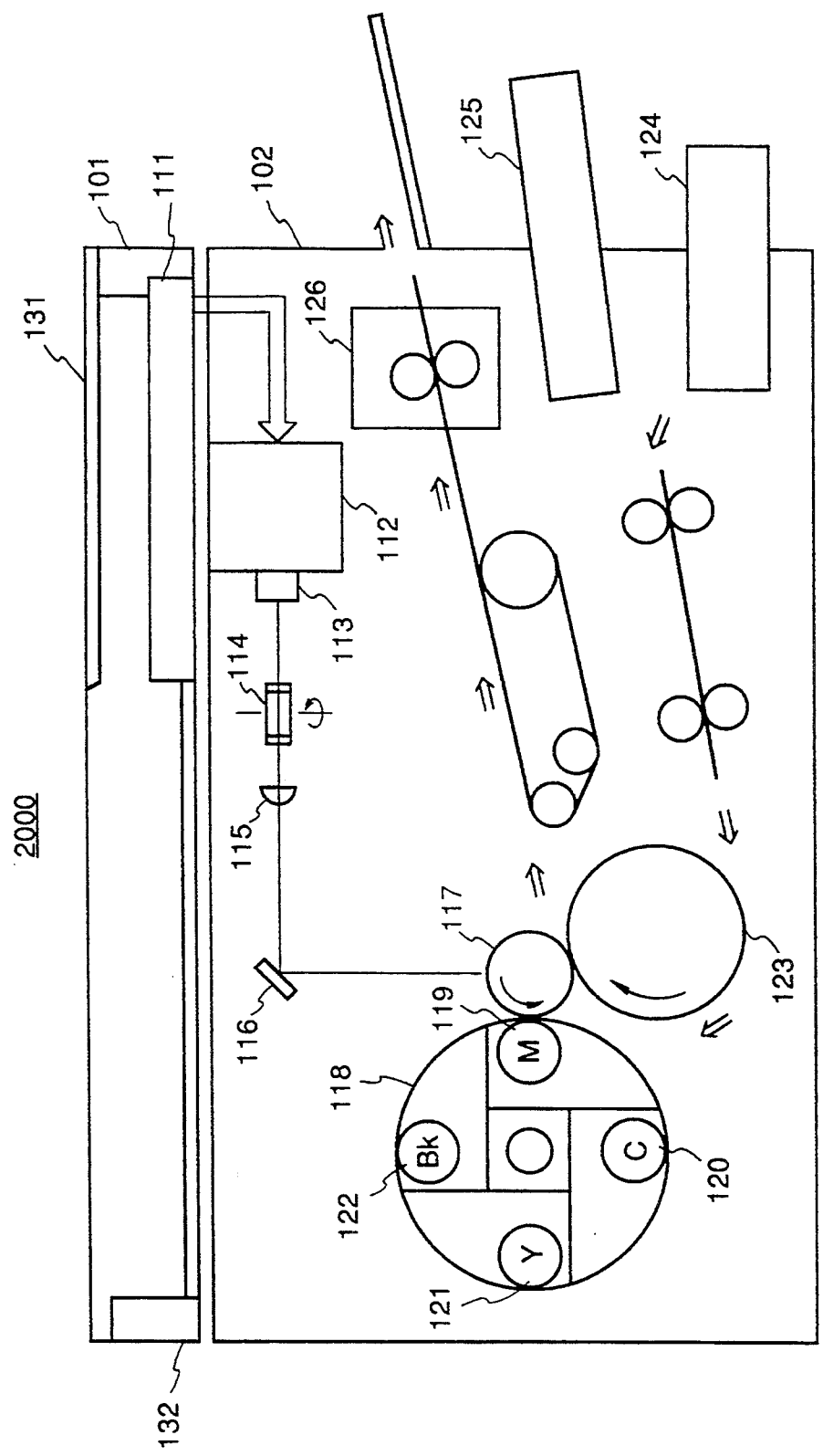
FIG. 2 is a cross-sectional view showing the construction of the printer shown in FIG. 1.
Figure 3:
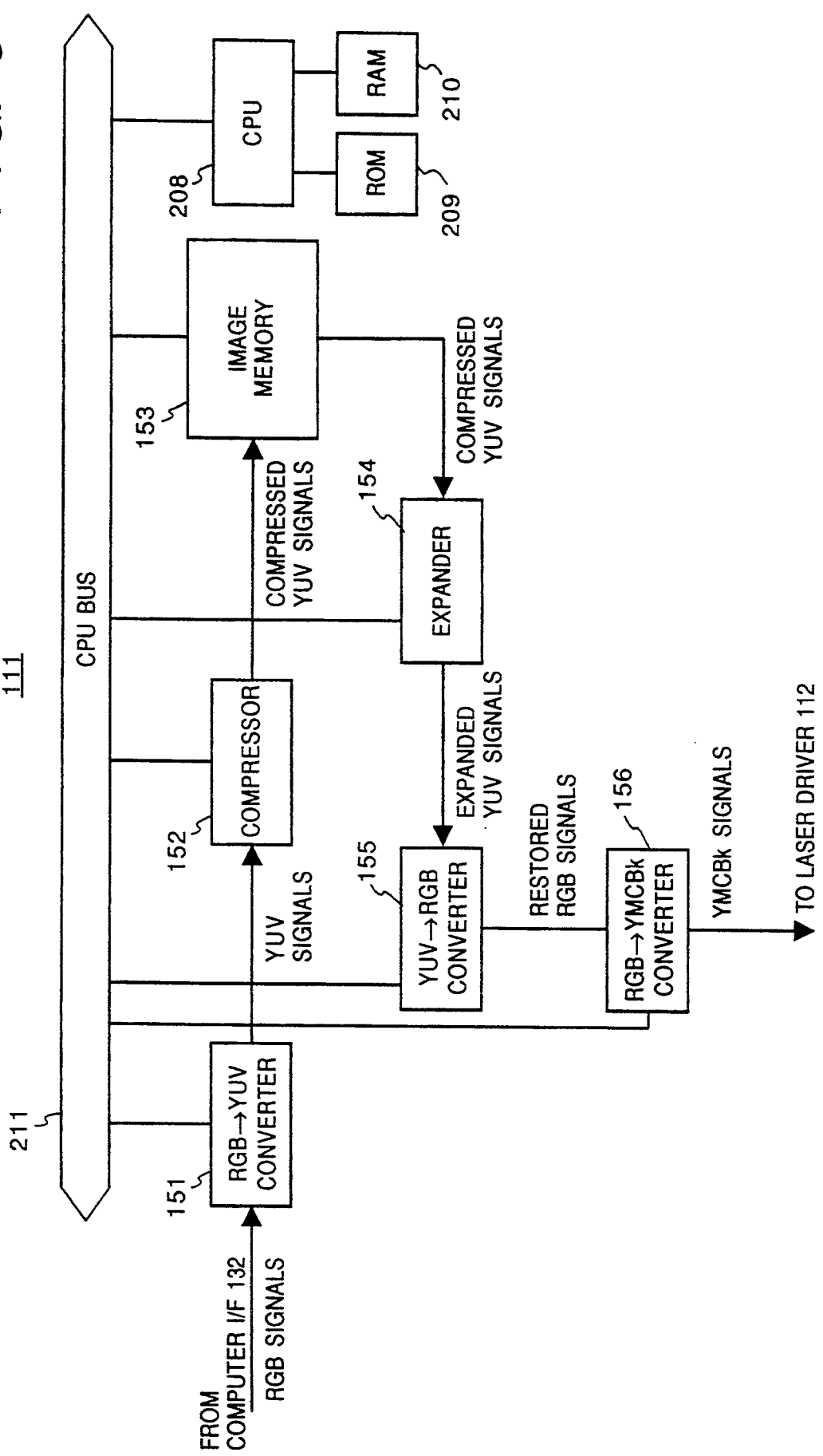
FIG. 3 is a block diagram showing the general processing which is executed by a signal processor 111 of the printer.

General description of the apparatus (FIGS. 1-3)

FIG. 1 is a block diagram showing the operating environment of a color printer such as a typical embodiment of the present invention. As shown in FIG. 1, a color printer 2000 of the present embodiment connects to a host computer 1000 (hereinafter referred to as a "host"), receives color image data (which is represented by RGB components and hereinafter referred to as "RGB signals") outputted from the host 1000, forms a color image, and outputs and prints the image on an output paper 3000.

FIG. 2 is a cross-sectional view showing the construction of the color printer 2000. The color printer 2000 is comprised of a data processing unit 101 which receives and processes the RGB signals from the host 1000 and a printing unit 102 which forms a print based on the data processed by the data processing unit 101. In FIG. 2, numeral 131 is an operation panel having an operation switch for switching between on-line and off-line to the host 1000 and an LCD for informing out-of-paper and toner exchange. Numeral 132 is a computer interface (I/F) which receives the RGB signals from the host 1000 connected to the color printer 2000 and inputs to the signal processor 111.

A printing unit 102 receives the data inputted by the I/F 132 and processed by a signal processor 111 and prints a full-color image on a print sheet at a resolution of 400 dpi (dots/inch).

The signal processor 111 processes the input RGB signals as described later in detail, separates the signals into magenta (M), cyan (C), yellow (Y), and black (Bk) components, and sends these components to the printing unit 102.

Each image signal M, C, Y or Bk received from the signal processor 111 is sent to a laser driver 112. The laser driver 112 modulates and drives a semiconductor laser 113 in accordance with the received image signal. The laser light is made to scan across a photosensitive drum 117 via a polygon mirror 114, an f-$\theta$ lens 115 and a mirror 116. Numeral 118 represents a revolving developer comprising a magenta developing section 119, a cyan developing section 120, a yellow developing section 121 and a black developing section 122. These four developing sections come into alternate contact with the photosensitive drum 117 so that an electrostatic image formed on the photosensitive drum is developed by means of the toners. Numeral 123 represents a transfer drum upon which paper fed from a paper cassette 124 or 125 is wound so that the image developed on the photosensitive drum 117 may be transferred to the paper.

After the four colors M, C, Y and Bk have thus been transferred successively, the paper is ejected through a fixing unit 126.

FIG. 3 is a block diagram showing the construction of the signal processor 111. In FIG. 3, numeral 151 is an RGB→YUV converter, numeral 152 is a compressor which compresses image data, numeral 153 is an image memory which stores the image data, numeral 154 is an expander which expands the compressed image data, numeral 155 is a YUV→RGB converter, and numeral 156 is an RGB→YMCBk converter. These elements are connected to a CPU 208 by a CPU bus 211 and controlled by the CPU 208.

The CPU 208 stores data in RAM 210 and executes various control programs stored in ROM 209 and controls each element of the signal processor 111. The CPU 208 transmits display data to the LCD of an operation panel 131 so as to display various messages, receives instructions inputted from the operation panel 131, and performs processing and controlling in accordance with the instruction.

As shown in FIG. 3, when the RGB signals transmitted from the I/F 132 are converted to YUV signals in the RGB→YUV converter 151, the YUV signals are compressed by the compressor 152 and the compressed YUV signals are stored in the image memory 153. When a predetermined amount (e.g. one page) of the data is stored in the image memory 153, the compressed YUV signals are read out of the image memory 153 and expanded by the expander 154. The expanded YUV signals are reverse-converted to RGB signals by the YUV→RGB converter 155 and the converted RGB signals are inputted into the RGB→YMCBk converter 156. Finally, the RGB signals are converted to the YMCBk signals by the RGB→YMCBk 156 and outputted to the laser driver 112.

Figure 4:
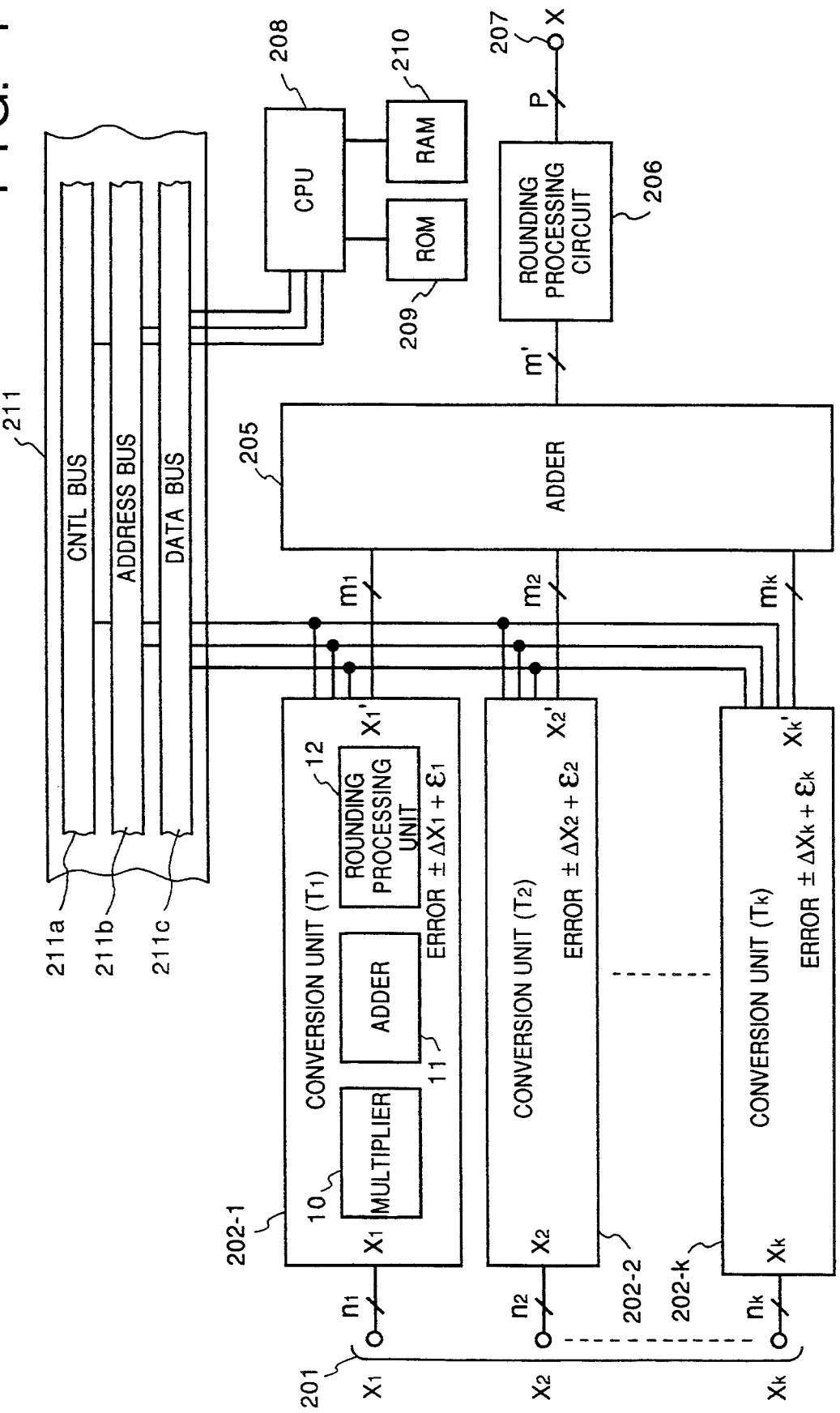
FIG. 4 is a block diagram showing the construction of a processor (RGB→YUV converter 151) in accordance with a first embodiment of the present invention.
Figure 5:
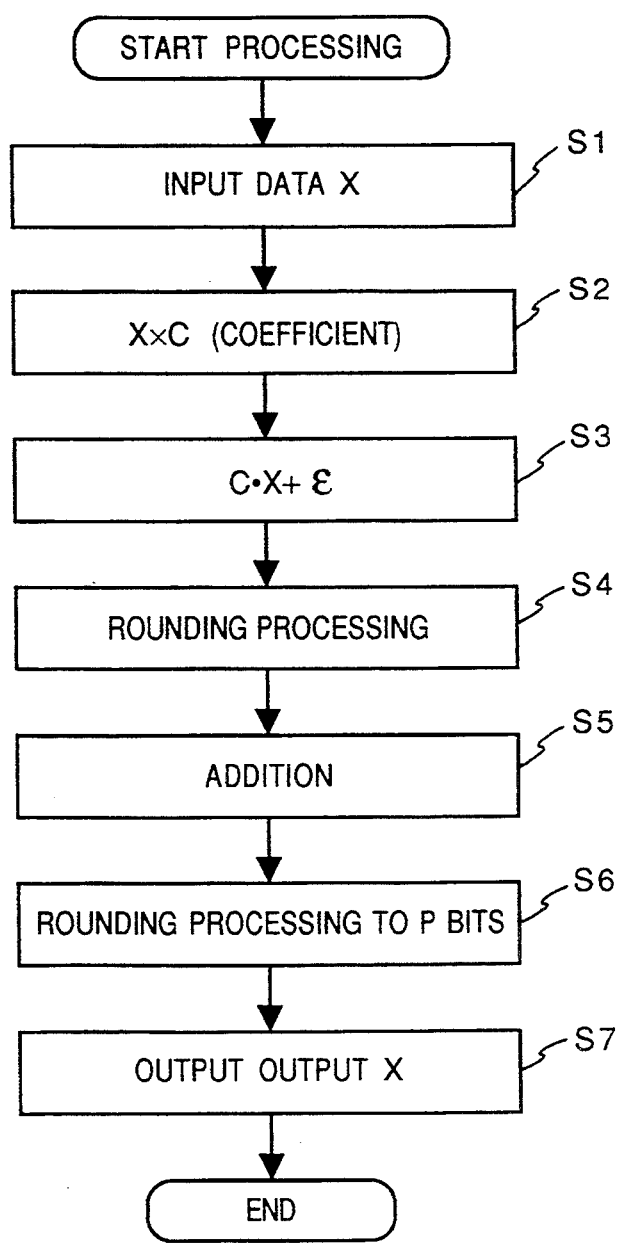
FIG. 5 is a flowchart for explaining the operation of the processing in accordance with the first embodiment.

The construction and operation of the RGB→YUV converter 151 (FIGS. 4–5)

FIG. 4 is a block diagram showing the construction of the RGB→YUV converter 151 in accordance with the present embodiment. The RGB→YUV converter 151 is comprised of input terminals 201, conversion units 202-1 ... 202-k, an adder 205, rounding processing circuit 206, and output terminal 207. A conversion coefficient (C) stored in the ROM 209 is loaded into the conversion units 202-1 ... 202-k via a CPU bus 211 by the control of the CPU 208. At this time, the conversion coefficient data itself is transferred via the data bus 211c and designation of an address of the storage address in the conversion units 202-1 ... 202-k is executed via an address bus 211b, and control of the start and end of data loading is executed via a control bus 211a.

The constructions of the conversion units 202-1 ... 202-k are the same; for example, the conversion unit 202-1 is comprised of a multiplier 10, adder 11, and rounding processing unit 12.

The construction of the conversion unit of the converter shown in FIG. 4 has a general construction such that k data whose data lengths are respectively $n_1$, $n_2$, ..., $n_k$ bits are inputted and the k data whose data lengths are respectively $m_1$, $m_2$, ..., $m_k$ bits are outputted. However, in the present embodiment, it is supposed that k=3 (which means that the color component is 3), $n_1=n_2=n_3=8$ bits, and $m_1=m_2=m_3=8$ bits. That is, the RGB signals representing each color component in 8 bits (256 gradations) are considered as input data, and YUV signals representing each color component in 8 bits (256 gradations), as output data.

For generation of each of the elements of the YUV signals, the RGB signal are inputted to the conversion units and converted to $m_1$, $m_2$, and $m_3$, these values are added by the adder 205, the rounding processing is performed on the added value, and a Y signal is outputted. Similarly, the conversion, addition, and rounding processing are performed on the same RGB signals and a U signal is outputted. Similarly, the conversion, addition, and rounding processing are performed on the same RGB signals and a V signal is outputted.

The processing operation of the RGB→YUV converter 151 is explained with reference to the flowchart shown in FIG. 5.

When k data $x_1$, $x_2$, ..., $x_k$ whose data length are respectively $n_1$, $n_2$, ..., $n_k$ bits are supplied from the input terminal 201 to the conversion units 202-1 ... 202-k (step S1), each of the input data is multiplied by a conversion coefficient (C) by the multiplier 10 (step S2) and $\epsilon_1$, $\epsilon_2$, ..., $\epsilon_k$ are added by the adder 11 (step S3). It should be noted that:

$$\sum_{i=1}^{k} \epsilon_i = -\alpha/2$$

The value $\epsilon_i$ is empirically obtained by laboratory evaluation. The value $\epsilon_i$ is stored in the ROM 209 with the values of the conversion coefficient and loaded to the adder 11 via the CPU bus 211 at the start of the apparatus.

Furthermore, the rounding processing is performed on the result by the rounding processing unit 12 (step S4) and the data $x'_1$, $x'_2$, ..., $x'_k$ whose data lengths are respectively $m_1$, $m_2$, ..., $m_k$ are outputted to the adder 205.

Subsequently, the data $x'_1$, $x'_2$, ..., $x'_k$ are added by the adder 205 and a single data whose data length is m' bits is obtained (step S5). Furthermore, the value obtained at step S5 is subjected to the rounding processing and rounded off as a P-bit value by the rounding processing circuit 206 (step S6) and an output X is outputted from the output terminal 207 (step S7).

In the above operation, the maximum error is generated in the conversion units 202-1 ... 202k when each of input data is multiplied by a coefficient and $\epsilon_1$, $\epsilon_2$, ..., $\epsilon_k$ are added, and then the rounding processing is performed. Therefore, the maximum error is the value obtained by adding $\pm\Delta x_1$, $\pm\Delta x_2$, ..., $\pm\Delta x_k$ to $\epsilon_1$, $\epsilon_2$, ..., $\epsilon_k$. That is:

$$\pm\Delta x_1+\epsilon_1, \pm\Delta x_2+\epsilon_2 ..., \pm\Delta x_k+\epsilon_k$$

Since the maximum error generated by the rounding processing circuit 206 is obtained by the formula (1), the maximum error in the output X is as shown in the formula (3).

$$\left. \begin{array}{l} \text{When } \alpha, \beta \geq 0, \\[4pt] \sum_{i=1}^{k} \Delta x_i - \alpha/2 + \alpha + \beta = \sum_{i=1}^{k} \Delta x_i + \alpha/2 + \beta \\ \text{(an error deviated to the positive direction from the true value)} \\[4pt] \sum_{i=1}^{k} \Delta x_i - \alpha/2 - \beta = -\left(\sum_{i=1}^{k} \Delta x_i + \alpha/2 + \beta\right) \\ \text{(an error deviated to the negative direction from the true value)} \end{array} \right\} \quad (3)$$

-continued

When $\alpha, \beta < 0$, $$\sum_{i=1}^{k} \Delta x_i - \alpha/2 - \beta$$

(an error deviated to the positive direction from the true value)

$$-\sum_{i=1}^{k} \Delta x_i - \alpha/2 + \alpha + \beta = -\left(\sum_{i=1}^{k} \Delta x_i - \alpha/2 - \beta\right)$$

(an error deviated to the negative direction from the true value)

Accordingly, as shown in the formula (3), in any case, absolute values of the maximum value deviated to the positive direction from the true value and the one deviated to the negative value are the same for arbitrary values of $\alpha, \beta$. The square of the maximum error which effects the S/N ratio of the output signal in this embodiment (hereinafter referred to as a "maximum error power") is expressed by the following formula (4) when $\alpha, \beta \geq 0$:

$$\left(\sum_{i=1}^{k} \Delta x_i\right)^2 + 2(\alpha/2 + \beta) \cdot \sum_{i=1}^{k} \Delta x_i + (\alpha/2 + \beta)^2 = \quad (4)$$

$$\left(\sum_{i=1}^{k} \Delta x_i\right)^2 + 2\beta \cdot \sum_{i=1}^{k} \Delta x_i + \beta^2 + \alpha\beta + \alpha \sum_{i=1}^{k} \Delta x_i + \alpha^2/4$$

Furthermore, the error span (the absolute value of the sum of errors deviated to the positive and negative directions from the true value) is as the follows:

$$2\left(\sum_{i=1}^{k} \Delta x_i + \beta\right) + \alpha \quad (5)$$

Referring to the formula (2), the maximum error power in the conventional apparatus is expressed by the formula (6) when $\alpha, \beta \geq 0$:

$$\left(\sum_{i=1}^{k} \Delta x_i\right)^2 + 2(\alpha + \beta) \cdot \sum_{i=1}^{k} \Delta x_i + (\alpha + \beta)^2 = \quad (6)$$

$$\left(\sum_{i=1}^{k} \Delta x_i\right)^2 + 2\beta \cdot \sum_{i=1}^{k} \Delta x_i + \beta^2 + 2\alpha\beta + 2\alpha \sum_{i=1}^{k} \Delta x_i + \alpha^2$$

The error span in this case is expressed by the formula (7):

$$2\left(\sum_{i=1}^{k} \Delta x_i + \beta\right) + \alpha \quad (7)$$

If the formulas (4) through (7) are compared, as shown in the formulas (5) and (7), the error spans are the same, but the maximum error power value can be reduced by $\alpha\beta + \frac{3}{4}\cdot\alpha^2 + \alpha\Sigma\Delta x_i$ in comparison with that of the conventional approach in the present embodiment. For $\alpha, \beta \geq 0$ is described above, however, the maximum error can also be reduced for the square of the maximum error without changing the error span when $\alpha, \beta < 1$.

According to the present embodiment, since the maximum error in the output X is symmetric to both positive and negative directions from the true value in the conversion unit by providing an adding unit between the multiplier and rounding processing unit, asymmetric error is eliminated and S/N ratio of the signal processing can be improved.

The construction and operation of the RGB→YUV converter 151 are described above the construction and operation of the YUV→RGB converter 155 are also similar to those of RGB→YUV converter 151. However, the YUV→RGB converter 155 performs color conversion from YUV to RGB, the conversion coefficient which is loaded from the ROM 209 to the conversion unit by the control of the CPU 208 is different from that of the RGB→YUV converter 151.

Accordingly, in the present embodiment, in the color conversion processing in the RGB→YUV converter 151 and YUV→RGB converter 155, since the color conversion processing resulting in an improved S/N ratio is performed, a color image processing which generates less noise and results in high-quality color reproducibly can be executed. Thus, the color reproducibility of the color printer is improved.

Second Embodiment

A second embodiment of the present invention is described below.

The RGB→YUV converter 151 described in the first embodiment is constructed so as to perform the multiply processing, adding processing, and rounding processing on each of the k input data in the conversion units ($T_1 \ldots T_k$) to correspond to any color conversion processing (generally a signal conversion processing). However, when the color conversion processing (the signal conversion processing) is oriented for a specific purpose and processes a signal which does not theoretically cause an input data error in the circuit design, the construction of the conversion units can be simplified. For example, this is the case where the transformation coefficient (C) concerning the p-th data (which is processed by the conversion unit ($T_p$)) of the k input data is $C=1$.

Such case is described below.

Figure 6:
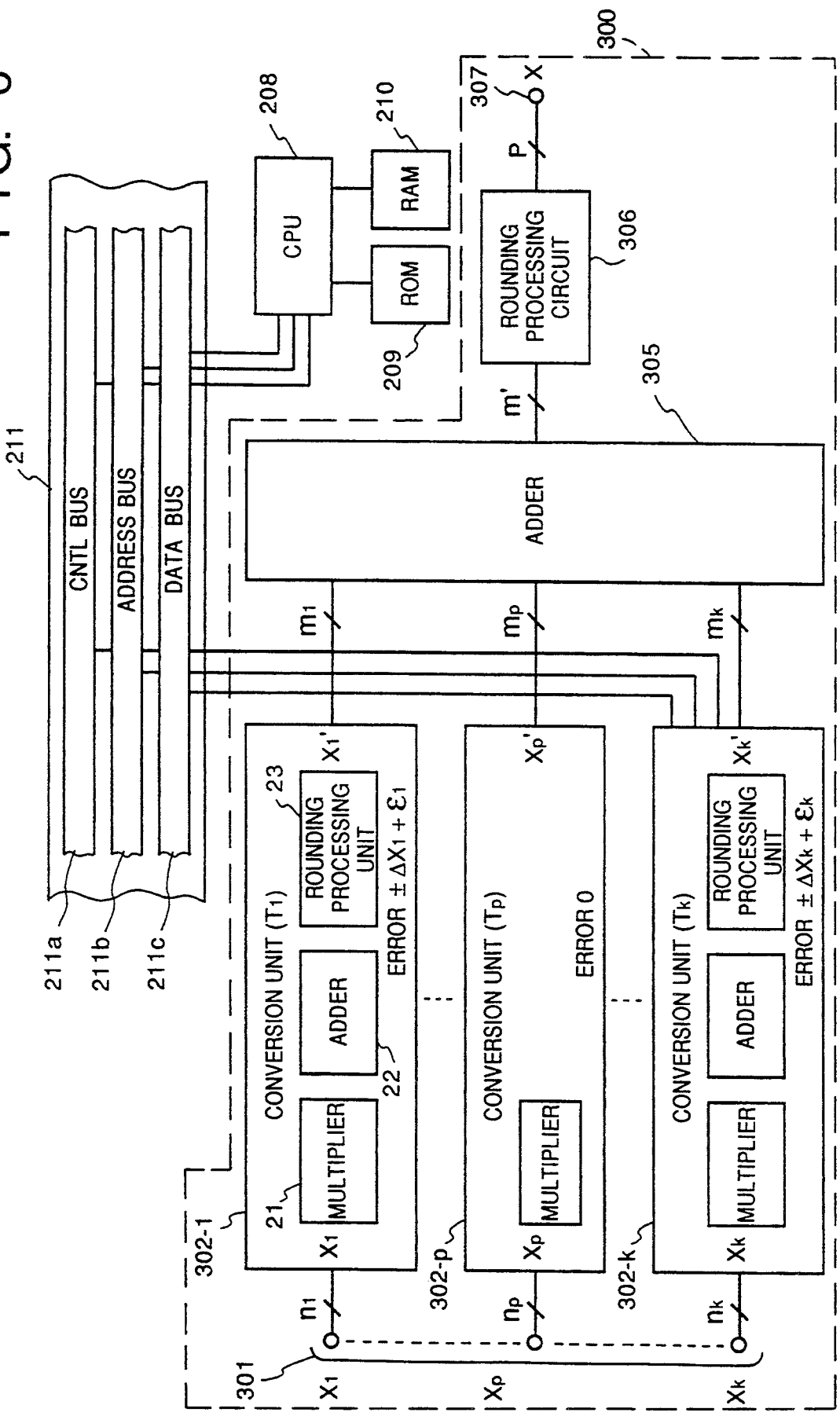
FIG. 6 is a block diagram showing the construction of the processor in accordance with a second embodiment of the present invention.

FIG. 6 is a block diagram showing the construction of the signal conversion processor 300° The signal conversion processor 300 connect-s to CPU, CPU bus, RAM, and ROM of the color printer such as units of the RGB→YUV converter 151 described in the first embodiment. Since the connection to such units is the same as that of the first embodiment, an explanation is not needed here.

The signal conversion processor 300 according to the present invention is comprised of an input terminal 301, conversion units ($T_1$) 302-1, . . . , ($T_p$) 302-p, . . . , ($T_k$) 302-k, adder 305, rounding processing circuit 306, and output terminal 307.

The constructions of the conversion units ($T_1$) 302-1, . . . , ($T_k$) 302-k are the same. The conversion unit 302-1, taken as an example, is comprised of a multiplier 21 adder 22, and rounding processing unit 23. The conversion unit ($T_p$) 302-p has only a multiplier.

Figure 7:
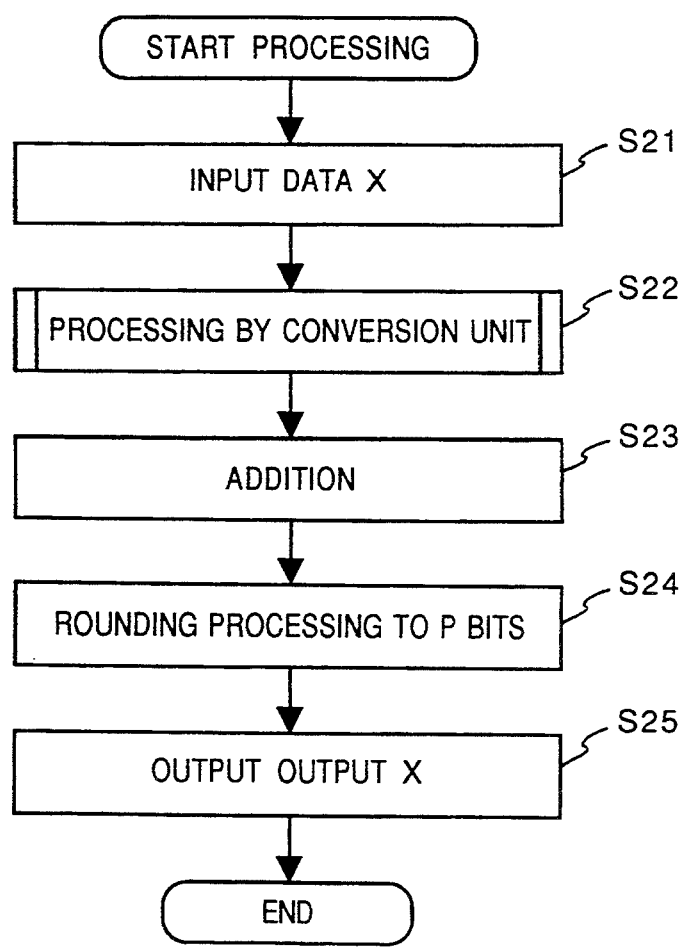
FIG. 7 is a flowchart for explaining the operation of the processing in accordance with the second embodiment.
Figure 8:
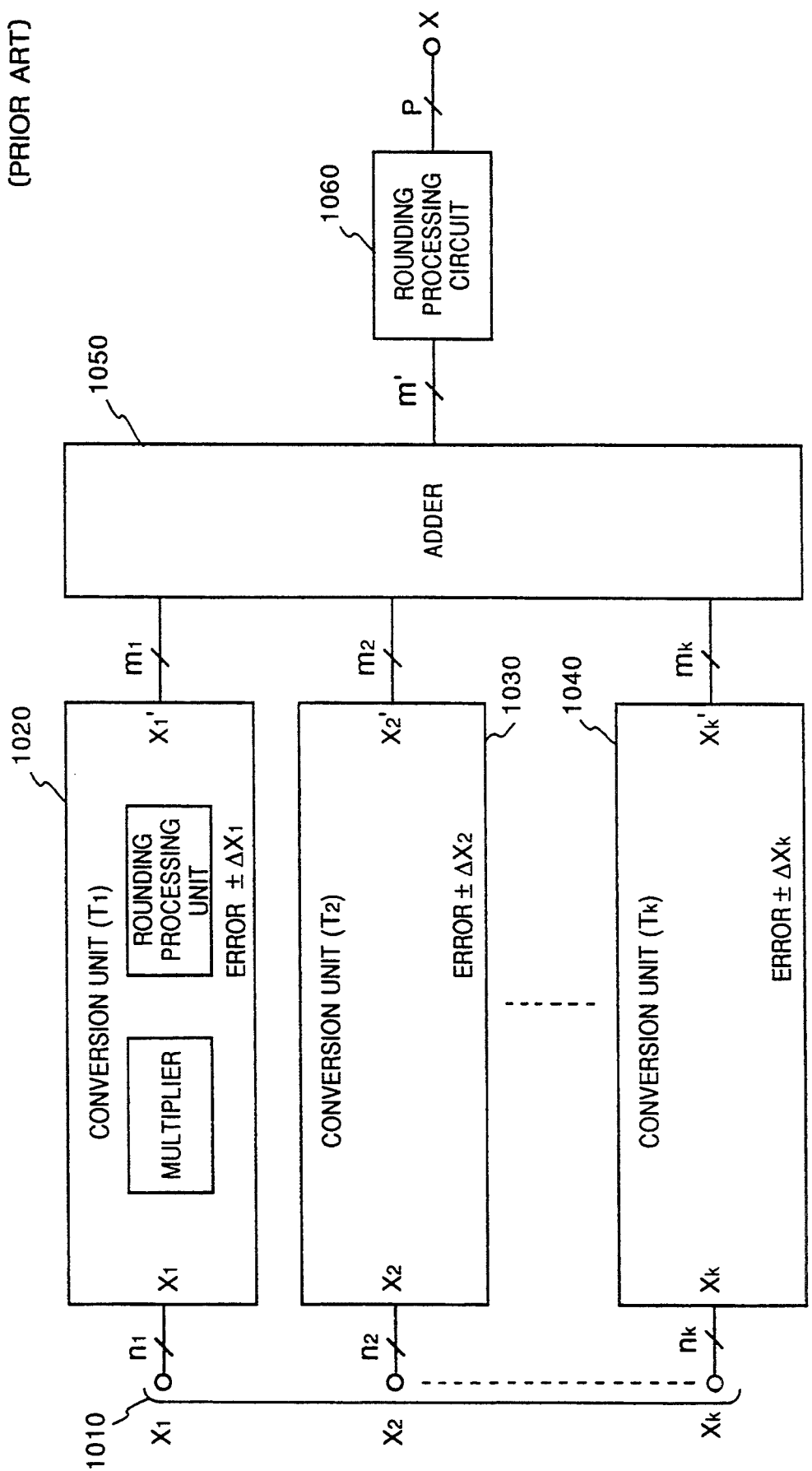
FIG. 8 is a block diagram showing the construction of the processing circuit in accordance with the conventional technique.

Referring to the flowchart shown in FIG. 7, the operation of the signal conversion processor 300 is described.

The k input data $x_1, \ldots x_p, \ldots x_k$ (whose data lengths are respectively $n_1, \ldots n_p, \ldots n_k$) inputted from the input terminal 301 are respectively supplied to the conversion units 302-1, . . . , 302-p, . . . , 392-k (step S21).

A conversion processing using k conversion units is performed at step S22.

The conversion unit ($T_1$) 302-1 is provided with an adder 22 between the multiplier 21 and rounding processing unit 23. The input $x_1$ is multiplied by an arbitrary constant, and then $\epsilon_1$ is added to the product by the adder 22. The rounding processing is performed on the result to round off to ml-bit-length data.

On the other hand, only multiplying processing is performed in the conversion unit ($T_p$) 302-p processing input data ($x_p$) which do not generate any error in the conversion processing. Accordingly, the conversion unit ($T_p$) 302-p is comprised of only the multiplier. The other input data ($x_2 \ldots x_k$) except the input data ($x_p$) are processed by the conversion unit having the same construction as that of the conversion unit 302-1.

The value added by the adder 22 is set so as to be:

$$\sum_{i=1}^{k} \epsilon_i = -\alpha/2 \quad (\text{wherein } i \neq p)$$

Note that $\alpha$ is an asymmetric element of the maximum error generated by the rounding processing unit 306. Accordingly, a processing by the conversion unit is performed.

In the adder 305, the data $x'_1, \ldots x'_2, \ldots x'_k$ are added and data whose data length is m'bit is generated (step S23). The data of the m'-bit length is rounded off to data of p-bit length (step S24). Thus, the result is outputted as an output X (step S25). Errors generated by the above operations are the errors generated in the conversion units $T_1, \ldots T_2, \ldots T_k$ (except the conversion unit $T_p$) and errors generated by the rounding processing circuit 306.

The errors generated by the conversion unit are as follows:

$$\sum_{i=1}^{k} \Delta x_i + \sum_{i=1}^{k} \Delta \epsilon_i = \sum_{i=1}^{k} \Delta x_i - \alpha/2$$

Errors generated by the rounding processing circuit 306 are the same as those indicated by the formula (1). Accordingly, the maximum error in the output X in the output terminal 307 is the same as that of the formula (3) which is described in the first embodiment.

According to the present embodiment, the maximum error power can be reduced without changing the error span in comparison with the conventional error span. According to the embodiment, the construction of the circuit of the signal conversion processor can be simplified depending on the conversion processing.

In the first embodiment, an input signal is assumed as being RGB signals and an output signal is as YUV signals. However, this does not impose a limitation upon the present invention. For example, other signals (such as YMCBk and L*a*b*) representing a color space can be used as an input or output signal.

In the above embodiment, the RGB→YUV converter 151 and signal conversion processor 300 are built in the color printer, however, this does not impose a limitation upon the present invention. For example, it can be applicable to a color adjusting apparatus for adjusting the color of a color image displayed or printed on a color display apparatus or color printer comprising a DTP (Desk Top Publishing) system.

In the above embodiment, as in FIG. 4, the multiplier 10, adder 11, and rounding processing unit 12 are provided for a circuit. However, it can be arranged that an output $X_1'$ is calculated by the CPU 208 with respect to the input $X_1$ beforehand, and the correspondence of $X_1$ and $X_1'$ can be set in the conversion unit 202-1 as table data.

The present invention can be applied to a system constituted by a plurality of devices, or to an apparatus comprising a single device. Furthermore, it goes without saying that the invention is applicable also to a case where the object of the invention is attained by supplying a program to a system or apparatus.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus comprising:
    conversion means for performing a conversion processing on a plurality of image data, and effecting a first rounding processing on the plurality of image data;
    addition means for adding the plurality of the image data outputted from said conversion means; and
    process means for performing a second rounding processing on the image data outputted from said addition means, wherein
    said conversion means respectively multiplies the plurality of the image data by a predetermined coefficient, and corrects each of the multiplied image data in consideration of asymmetric rounding error data of the second rounding processing.

2. The apparatus according to claim 1, wherein said conversion means adds
    a correction term to each of the multiplied image data in order to correct for asymmetric rounding error data of the first rounding processing.

3. The apparatus according to claim 1, wherein said conversion means does not perform correction when there is no asymmetric rounding error data of said process means.

4. The apparatus according to claim 2, further comprising:
    storage means for storing said predetermined coefficient and said correction term.

5. The apparatus according to claim 2, wherein said asymmetric rounding error data of said process means are evenly distributed in both a positive and negative direction from the true values.

6. The apparatus according to claim 1, further comprising:
    input means for inputting a plurality of said image data from an external image data source;
    communication means for communicating with the external image data source to input the image data from the external image data source;
    image formation means for forming an image in accordance with the result outputted from said process means; and
    output means for outputting the image formed by said image formation means.

7. The apparatus according to claim 6, wherein each of the plurality of the image data is a first color image data representing a color component, and
    said conversion means converts the first color image data represented by one color space into second color image data represented by another color space.

8. The apparatus according to claim 7, wherein the color space is an RGB color space, and the other color space is a YUV color space.

9. The apparatus according to claim 6, wherein said external image data source comprises a host computer.

10. A method of processing a plurality of image data with at least two rounding processes comprising the steps of:

inputting a plurality of image data;

respectively multiplying the plurality of image data by a predetermined conversion coefficient;

correcting each of the plurality of multiplied image data with consideration of asymmetric rounding error data of a second rounding processing;

performing first rounding processing on each of the corrected image data;

adding the corrected image data which is subjected to the first rounding processing step;

performing second rounding processing on the added image data; and outputting a final result by the second rounding processing step.

* * * * *

UNITED STATES PATENT AND TRADEMARK OFFICE
CERTIFICATE OF CORRECTION

PATENT NO. : 5,396,346
DATED : March 7, 1995
INVENTOR(S) : Tadayoshi Nakayama, et al.

Page 1 of 2

It is certified that error appears in the above-identified patent and that said Letters Patent is hereby corrected as shown below:

In the Abstract, line 8, delete "10".

Column 3, line 14, change "step" (first occurrence) to --steps--.

Column 6, line 7, change ",on" to --on--;
line 19, change "$\epsilon k$" to --$\epsilon_k$--; and
line 25, insert --($\alpha$: an asymmetric element of the maximum error generated by the rounding processing circuit 206)--.

Column 7, line 65, change "$\beta<1$." to --$\beta<0$.--.

Column 8, line 6, change "above" to --above,--;
line 44, change "300°" to --300.--;
line 45, change "connect-s" to --connects--; and
line 58, change "multiplier 21" to --multiplier 21,--.

UNITED STATES PATENT AND TRADEMARK OFFICE
CERTIFICATE OF CORRECTION

PATENT NO. : 5,396,346
DATED : March 7, 1995
INVENTOR(S) : Tadayoshi Nakayama, et al.

It is certified that error appears in the above-identified patent and that said Letters Patent is hereby corrected as shown below:

Column 9, line 8, change "m1-" to --$m_1$- --;
    line 13, "The" should begin a new paragraph;
    line 27, change "m'bit" to --m' bit--; and
    line 30, "Errors" should begin a new paragraph.

Signed and Sealed this

Sixth Day of June, 1995

*Attest:*

BRUCE LEHMAN

*Attesting Officer*     *Commissioner of Patents and Trademarks*